(12) United States Patent
Honma et al.

(10) Patent No.: US 8,490,600 B2
(45) Date of Patent: Jul. 23, 2013

(54) COMMON RAIL, COMMON RAIL HOLDER, AND METHOD OF PRODUCING COMMON RAIL

(75) Inventors: Ryuichi Honma, Tokyo (JP); Ryuji Uemori, Tokyo (JP); Yasushi Hasegawa, Tokyo (JP); Yutaka Takagi, Hashima (JP)

(73) Assignees: Nippon Steel & Sumitomo Metal Corporation, Tokyo (JP); Fukujukogyo Co., Ltd., Hashima-shi (JP)

( * ) Notice: Subject to any disclaimer, the term of this patent is extended or adjusted under 35 U.S.C. 154(b) by 368 days.

(21) Appl. No.: 13/054,877

(22) PCT Filed: Oct. 13, 2010

(86) PCT No.: PCT/JP2010/067922
§ 371 (c)(1),
(2), (4) Date: Jan. 19, 2011

(87) PCT Pub. No.: WO2011/062011
PCT Pub. Date: May 26, 2011

(65) Prior Publication Data
US 2011/0239989 A1    Oct. 6, 2011

(30) Foreign Application Priority Data
Nov. 19, 2009    (JP) .............................. P2009-264147

(51) Int. Cl.
*F02M 69/46* (2006.01)
*F16L 19/00* (2006.01)

(52) U.S. Cl.
USPC ........... 123/456; 123/468; 123/469; 285/354; 285/266; 285/133.11; 285/133.4; 285/125.1

(58) Field of Classification Search
USPC ....... 123/447, 470, 456, 468, 469; 285/125.1, 285/133.11, 133.4, 354, 266; 29/402.07
See application file for complete search history.

(56) References Cited

U.S. PATENT DOCUMENTS

| | | | |
|---|---|---|---|
| 6,913,842 B2 * | 7/2005 | Hasegawa et al. ............. | 428/681 |
| 7,246,601 B2 * | 7/2007 | Yamamoto et al. ........... | 123/456 |
| 2004/0245223 A1 * | 12/2004 | Kondo et al. .............. | 219/117.1 |

(Continued)

FOREIGN PATENT DOCUMENTS

| JP | 9-317959 A | 12/1997 |
|---|---|---|
| JP | 9-317969 A | 12/1997 |

(Continued)

OTHER PUBLICATIONS

Notice of Allowance mailed Jul. 23, 2012 in Korean patent application No. 10-2011-7004553 (English translation is attached).

(Continued)

*Primary Examiner* — Stephen K Cronin
*Assistant Examiner* — Joseph Dallo
(74) *Attorney, Agent, or Firm* — Birch, Stewart, Kolasch & Birch, LLP

(57) ABSTRACT

The present invention provides a common rail formed by bonding a common rail body and a common rail holder which has a pressing surface and a convex bonding surface, by means of a heat pressure bonding process and a liquid phase diffusion bonding process, wherein the height H of the convex bonding surface satisfies $1\ \mu m \leq H \leq 50\ \mu m$, and the common rail holder includes a deformation introducing portion in which an area of a cross-section parallel to the pressing surface is smaller than the area of the pressing surface.

14 Claims, 4 Drawing Sheets

U.S. PATENT DOCUMENTS

| | | | |
|---|---|---|---|
| 2006/0163321 A1* | 7/2006 | Hasegawa et al. | 228/101 |
| 2006/0191215 A1* | 8/2006 | Stark | 52/204.6 |
| 2009/0110575 A1* | 4/2009 | Munakata et al. | 417/437 |
| 2010/0095934 A1* | 4/2010 | Hasegawa et al. | 123/447 |
| 2010/0143747 A1* | 6/2010 | Hasegawa et al. | 428/680 |
| 2011/0005493 A1* | 1/2011 | Hirano et al. | 123/456 |
| 2011/0148102 A1* | 6/2011 | Tsure et al. | 285/332 |

FOREIGN PATENT DOCUMENTS

| | | |
|---|---|---|
| JP | 2003-214291 A | 7/2003 |
| JP | 2004-114146 A | 4/2004 |
| JP | 2005-324245 A | 11/2005 |
| JP | 2006-77716 A | 3/2006 |
| JP | 2006-159212 A | 6/2006 |
| JP | 2006-324246 A | 11/2006 |
| JP | 2007-40244 A | 2/2007 |

OTHER PUBLICATIONS

International Search Report, dated Nov. 9, 2010, issued in corresponding International Application PCT/JP2010/067922.

* cited by examiner

COMMON RAIL, COMMON RAIL HOLDER, AND METHOD OF PRODUCING COMMON RAIL

TECHNICAL FIELD

The present invention relates to a common rail, a common rail holder, and a method of producing a common rail.

This application claims priority on Japanese Patent Application No. 2009-264174 filed on Nov. 19, 2009, the content of which is incorporated herein by reference.

BACKGROUND ART

Recently, vehicles with a diesel engine that uses a gas oil as a fuel are increased in Europe and in other countries. Therefore, technical developments of fuel injection devices are offered, and advanced performance of common rails is particularly required.

A common rail is a distributing device that retains high-pressured injection fuel, in which a gas oil pumped from a fuel tank by a pump is temporary retained, and thus, the common rail is an important part in a fuel injection device of the diesel engine. The gas oil retained in the common rail is discharged from an orifice (discharging outlet), and is distributed to each injection nozzle provided for respective combustion chamber, via pipes attached to a common rail holder (hereinafter, sometimes simply referred to "holder"). The gas oil transmitted to the injection nozzle is mixed with a combustion air, and then injected to the engine combustion chamber for causing explosive combustion.

In order to improve the combustion efficiency of the gas oil, it is desired to increase the gas oil pressure in the common rail. If the gas oil pressure in the common rail is increased, high power, low fuel consumption, and high torque can be achieved by using a gas oil including a small amount of impurities. Thus, for realizing high pressurized fuel, advanced performance of the common rail is demanded.

Generally, common rails are produced by integrally forging both of a common rail body part and a common rail holder part, and subsequently performing a complicated machining process to define distribution-conduits. In this case, the strength of the common rail can be enhanced by optimizing, for example, chemical components of a steel used for the common rail or production conditions such as heat treatment conditions. Such optimizations make it possible to realize common rails with high reliability that can bear the fuel injection pressure of 160 MPa or more.

However, when the strength of the steel used for the common rail is thus enhanced, the formability and the workability deteriorate, and this results in a high production cost. Therefore, to take the place of conventional forging methods for producing a common rail by means of an integral forming process and a machining process, advanced methods for producing common rails have been demanded. Then, common rail producing techniques in which a common rail is produced by separately preparing a common rail body and a holder, and bonding these separate parts have been suggested.

The Patent Document 1, as shown in FIG. 1, discloses a liquid phase diffusion bonding method that includes a process of arranging an amorphous alloy metal foil 5 between bonding surfaces of a common rail body 1 and a holder 2, and a process of applying a pressure to the holder 2 in the direction indicated by an arrow 60. As shown in FIG. 1, in the common rail body 1, an inner conduit 3 and a branch conduit 4 are provided. Through this inner conduit 3, a fuel (gas oil) pumped from a fuel tank (not shown) by a fuel pump (not shown) is introduced into the common rail body 1 (as indicated by an arrow 11 in FIG. 1). Meanwhile, the inner conduit 3 communicates with a pipe (not shown) which is provided for transmitting the fuel to an injection nozzle (not shown) in an engine combustion chamber via a branch conduit 4 (as indicated by an arrow 12 in FIG. 1).

In FIG. 1, only one branch conduit 4 is given for the sake of convenience, however, a common rail body 1 generally has a plurality of branch conduits 4 that correspond to a plurality of injection nozzles in an engine combustion chamber. Further, a common rail body 1 is generally provided with a plurality of holders 2 that correspond to a plurality of branch conduits 4, in order to connect the plurality of the branch conduit 4 with a plurality of pipes for pumping a fuel to the injection nozzles in the engine combustion chamber. After performing a liquid phase diffusion bonding process for bonding the holder 2 and the common rail body 1, a uniform structure is generated at a bonding portion due to an isothermal solidification. As a result, an excellent bonding quality and an accurate shape are secured and the common rail productivity can be improved.

The Patent Documents 2 and the Patent Document 3 disclose mechanical part manufacturing methods that can be applied for bonding a common rail body and a holder. These methods include a process of arranging an amorphous alloy metal foil between bonding surfaces, a process of performing a heat pressure bonding process (first bonding step), and a process of performing a liquid phase diffusion bonding process (second bonding step). In these methods, a molten pressure-bonded portion formed by the heat pressure bonding process is heated to the melting point of the amorphous alloy metal foil or higher, and then, this temperature is held so as to complete the solidification. These methods make it possible to shorten the time required for the liquid phase diffusion bonding process, and the deformation of the mechanical part can be suppressed.

In addition, the Patent Document 4 discloses a method in which, at the time of performing a first bonding step, a common rail body is fixed to a dedicated jig, and the angle between a welding electrode surface and a bonding surface is adjusted to be 0.03° or less. This method makes it possible to achieve an accurate bonding, since the axis to axis distance between a center axis of a holder and a center axis of a branch conduit in the common rail body, that is, the amount of a bonding displacement becomes small after the first bonding step.

RELATED ART DOCUMENTS

Patent Documents

Patent Document 1: Japanese Unexamined Patent Application, First Publication No. 2003-214291
Patent Document 2: Japanese Unexamined Patent Application, First Publication No. 2005-324245
Patent Document 3: Japanese Unexamined Patent Application, First Publication No. 2006-159212
Patent Document 4: Japanese Unexamined Patent Application, First Publication No. 2007-040244

DISCLOSURE OF THE INVENTION

Problems to be Solved by the Invention

However, further studies conducted by the inventors of the present invention discovered that, depending on shapes or materials of the parts, a deformation as shown in FIG. 2 is occurred in some holders, at the time of performing an electric resistance welding as a first bonding step, thereby deteriorating an accuracy of the holder shape. In FIG. 2, broken lines represent a shape of the holder 2 before the deformation, and continuous lines represent a shape of the holder 2 after the deformation. As shown in FIG. 2, a bonding displacement "c" between a center axis "a" of the holder 2 and a center axis "b" of the branch conduit 4 of the common rail body 1, an inner side opening amount 21 of the holder 2, and a gap 22 between an inner side of the holder 2 and an inner side of the common rail body 1 after the first bonding step are increased. The inventors of the present invention found that this is because, even in a short time, the entire holder 2 is pressed in a high temperature, at the time of performing the first bonding step.

Furthermore, if one of a current applying duration, an electric current value, and a welding force in the first bonding step is varied due to some sort of factors, the deformation amount of the holder 2 changes in accordance with that variation. As a result, every time the first bonding step is performed for bonding the holder 2, for example, the height of the holder 2 or the pitches of a screw-thread formed on an inner side of the holder 2 are unfortunately varied.

FIG. 3 shows a schematic view of the shapes of the holder 2 before and after the first bonding step. The broken lines represent a shape of the holder 2 before the bonding process, and the continuous lines represent a shape of the holder 2 after the bonding process. In the example shown in FIG. 3, conditions of the first bonding step are better than the conditions employed for the example shown in FIG. 2. However, after the first bonding step, the wall thickness of the entire holder 2 is increased, and the screw-thread portion 31 is also deformed.

If even one of a plurality of the holders 2 in a common rail is deformed, the common rail becomes a defective product, or additional process to correct the shape will be required.

In view of the above circumstances, the object of the present invention is to provide a method of producing a common rail with a high productivity, that can obtain a required joint performance and an accurate shape by suppressing a deformation of a part without a shape correction process after a bonding process.

Means for Solving the Problems

The present invention employs the following configurations and methods for solving the above-mentioned problems.
(1) A first aspect of the present invention is a common rail formed by bonding a common rail body and a common rail holder which has a pressing surface and a convex bonding surface, by means of a heat pressure bonding process and a liquid phase diffusion bonding process, wherein a height H of the convex bonding surface satisfies Formula 1, and the common rail holder includes a deformation introducing portion in which an area of a cross-section parallel to the pressing surface is smaller than the area of the pressing surface.

$$1\ \mu m \leq H \leq 50\ \mu m \quad \text{(Formula 1)}$$

(2) In the common rail according to (1), the height h of the deformation introducing portion before the heat pressure bonding process may satisfy Formula 2 and a wall thickness T at the pressing surface and a wall thickness t at the convex bonding surface may satisfy Formula 3.

$$1.0\ mm \leq h \leq 5.0\ mm \quad \text{(Formula 2)}$$

$$0.3\ mm \leq T-t \leq 1\ mm \quad \text{(Formula 3)}$$

(3) In the common rail according to (1) or (2), an outside diameter D of the convex bonding surface and a wall thickness t at the convex bonding surface before the heat pressure bonding process may satisfy Formula 4.

$$4.35 \leq D/t \leq 21.7 \quad \text{(Formula 4)}$$

(4) In the common rail according to (1) or (2), an outside diameter D of the convex bonding surface, a wall thickness t of the convex bonding surface, and a height h of the deformation introducing portion may satisfy Formula 5.

$$D/t \leq h/0.23 \quad \text{(Formula 5)}$$

(5) In the common rail according to (1) or (2), a wall thickness of the deformation introducing portion may be tapered toward the convex bonding surface.
(6) A second aspect of the present invention is a common rail holder having a pressing surface and a convex bonding surface for forming a common rail by being bonded to a common rail body, by means of a heat pressure bonding process and a liquid phase diffusion bonding process, wherein a height H of the convex bonding surface satisfies Formula 1, the common rail holder includes a deformation introducing portion in which an area of a cross-section parallel to the pressing surface is smaller than an area of the pressing surface, a height h of the deformation introducing portion satisfies Formula 2, and a wall thickness T at the pressing surface and a wall thickness t at the convex bonding surface satisfy Formula 3.

$$1\ \mu m \leq H \leq 50\ \mu m \quad \text{(Formula 1)}$$

$$1.0\ mm \leq h \leq 5.0\ mm \quad \text{(Formula 2)}$$

$$0.3\ mm \leq T-t \leq 1\ mm \quad \text{(Formula 3)}$$

(7) In the common rail holder according to (6), an outside diameter D of the convex bonding surface and a wall thickness t at the convex bonding surface may satisfy Formula 4.

$$4.35 \leq D/t \leq 21.7 \quad \text{(Formula 4)}$$

(8) In the common rail holder according to (7) or (8), an outside diameter D of the convex bonding surface, a wall thickness t at the convex bonding surface, and the height h of the deformation introducing portion may satisfy Formula 5.

$$D/t \leq h/0.23 \quad \text{(Formula 5)}$$

(9) In the common rail holder according to (6) or (7), a wall thickness of the deformation introducing portion may be tapered toward the convex bonding surface.
(10) A third aspect of the present invention is a method of producing a common rail formed by bonding a common rail body and a common rail holder which has a pressing surface and a convex bonding surface, including: performing a heat pressure bonding process to form a molten pressure-bonded portion by arranging an amorphous alloy metal foil between the common rail body and the common rail holder, the common rail holder having a deformation introducing portion in which the area of a cross-section parallel to the pressing surface is smaller than the area of the pressing surface; and performing a liquid phase diffusion bonding process by heating the molten pressure-bonded portion to a temperature equal to the melting point of the amorphous alloy metal foil or higher, and holding the temperature to solidify the molten pressure-bonded portion.
(11) In the method of producing the common rail according to (10), a height h of the deformation introducing portion before the heat pressure bonding process may satisfy Formula 2, and a wall thickness T at the pressing surface and a wall thickness t at the convex bonding surface may satisfy Formula 3.

$$1.0\ mm \leq h \leq 5.0\ mm \quad \text{(Formula 2)}$$

$$0.3\ mm \leq T-t \leq 1\ mm \quad \text{(Formula 3)}$$

(12) In the method of producing the common rail according to (10) or (11), an outside diameter D of the convex bonding surface and a wall thickness t at the convex bonding surface before the heat pressure bonding process may satisfy Formula 4.

$$4.35 \leq D/t \leq 21.7 \quad \text{(Formula 4)}$$

(13) In the method of producing the common rail according to (10) or (11), an outside diameter D of the convex bonding surface, a wall thickness t at the convex bonding surface, and a height h of the deformation introducing portion may satisfy Formula 5.

$$D/t \leq h/0.23 \quad \text{(Formula 5)}$$

(14) In the method of producing the common rail according to (10) or (11), a wall thickness of the deformation introducing portion may be tapered toward the convex bonding surface.

Effects of the Invention

According to the above configurations and methods, the deformation introducing portion provided in the common rail holder makes it possible to largely reduce the holder deformation amount due to the heat pressure bonding process (first bonding step). Therefore, in the common rail that is produced by performing the liquid phase diffusion bonding process (second bonding step) after the heat pressure bonding process, the required joint performance and the accurate shape can be obtained without a shape correction process after the bonding process. Specifically, according to the above configurations and methods, the pitches of the screw-thread formed on the inner side of the holder and the shape of the fitting portion do not vary after the first bonding step. Therefore, even if the holder subjects to an accurate machining process before the bonding process, subsequent processes such as an assembling process can be performed without performing the correction process after the bonding process. Because of these effects, high productivity of the common rail can be realized when compared to that of the related art.

In addition, with a simple and convenience method, it is possible to produce common rails in which the variability of the holder shape after the bonding process and the defect occurring ratio are reduced, thereby improving the productivity at a low cost. Further, it is possible to produce a common rail that can bear a high fuel injection pressure of up to 250 MPa. As a result, a high-powered, low-fuel-consuming, and high torque diesel engine that uses a gas oil as a fuel can be achieved.

EMBODIMENTS OF THE INVENTION

Hereinbelow, a preferable embodiment of the present invention is explained with reference to the attached drawings.

Figure 4:
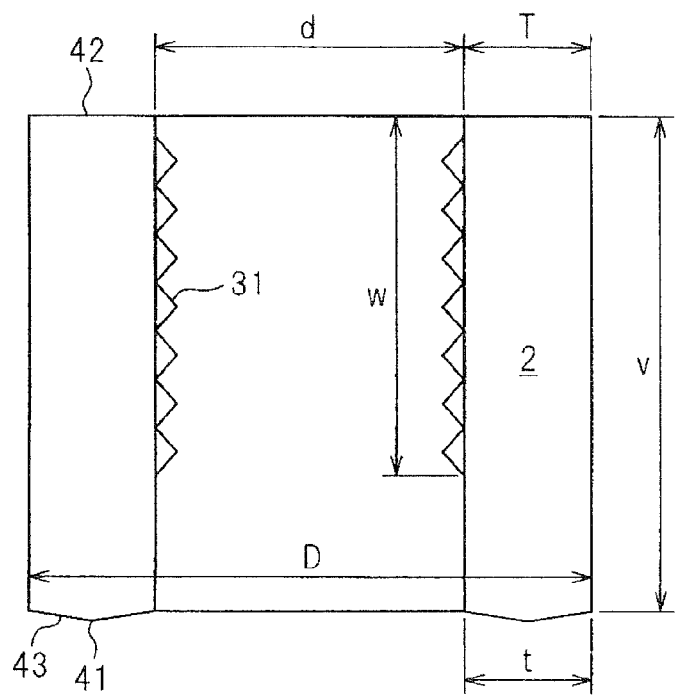
FIG. 4 shows an example of a holder according to related art.

In a related art, as shown in FIG. 4, a holder has a constant wall thickness from a pressing surface which contacts with an electrode of an electric resistance welder to a bonding surface which connects with a common rail body.

Figure 5:
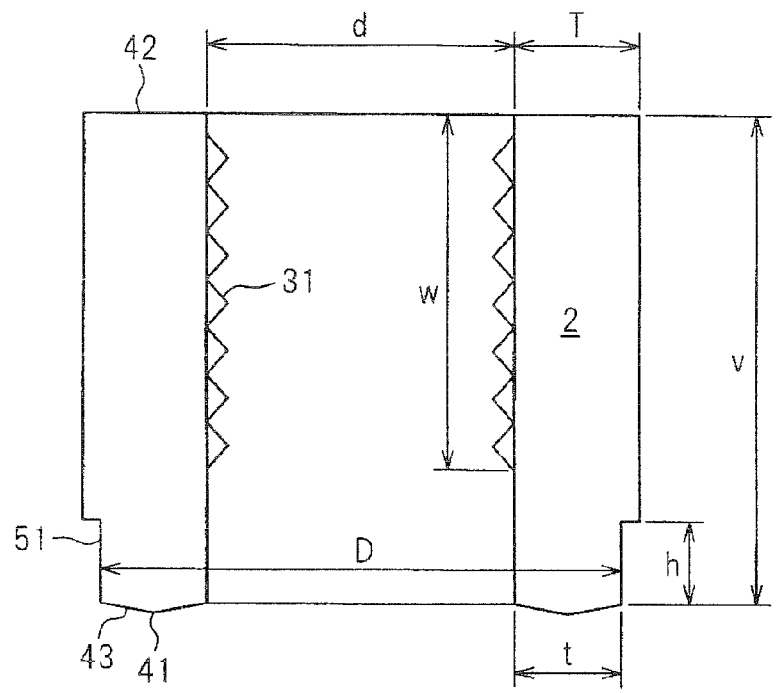
FIG. 5 shows an example of a holder having a stepped deformation introducing portion (reduced wall thickness portion to be crushed), according to an embodiment of the present invention.

A common rail holder according to this embodiment of the present invention, as shown in FIG. 5, has a deformation introducing portion (reduced wall thickness portion to be crushed) at a portion in the vicinity of a bonding surface of the holder so as to be purposely deformed. With a configuration in which the wall thickness at the bonding surface is thinner than the other portion, the bonding surface is preferentially heated at the time of performing an electric resistance welding in a first bonding step so as to significantly reduce the deformation of the entire holder, and to suppress variability of the holder shape.

Hereinbelow, technical terms are explained with reference to FIG. 5.

A bonding surface 41 of a holder means a surface of the holder that connects with a common rail body.

A pressing surface 42 of a holder means a surface of the holder that contacts with an electrode of an electric resistance welder at the time of bonding the holder to a common rail body.

A deformation introducing portion 51 means a portion, which is provided in a bonding surface 41, and which has a wall thickness thinner than the wall thickness at a pressing surface 42. That is, the holder has a deformation introducing portion in which the area of the cross-section parallel to the pressing surface 42 is smaller than the area of the pressing surface 42.

A height h of a deformation introducing portion 51 means a length of the deformation introducing portion 51 in the pipe axis direction of the holder.

In the holder, a convex bonding portion 43 (groove portion) may be formed at the bonding surface 41 so as to concentrate a welding current. The convex bonding portion 43 is a portion different from the deformation introducing portion 51 that suppresses a buckling deformation of the holder, and thus, the height h of the deformation introducing portion does not include the height of the convex bonding portion 43.

Here, it is preferable that the height H of the convex bonding portion 43 satisfies Formula 1.

$$1 \, \mu m \leq H \leq 50 \, \mu m \quad \text{(Formula 1)}$$

When the H is smaller than 1 µm, the effect of concentrating a welding current is not sufficiently obtained. On the other hand, when the H is larger than 50 µm, a sufficient bonding area cannot be obtained.

In a method of producing the common rail according to this embodiment, an electric resistance welding is performed as a first bonding step, by arranging an amorphous alloy metal foil between bonding surfaces of the common rail body and the holder. By the first bonding step, the common rail body and the holder are molten and pressure bonded together with the amorphous alloy metal foil. Here, at the molten pressure-bonded portion, a part of the amorphous alloy metal foil comes out as a molten metal, thereby forming a thin bonded alloy metal layer. After the first bonding step, a second bonding step (liquid phase diffusion bonding process) is performed by heating the molten pressure-bonded portion to the melting point of the amorphous alloy metal foil or higher. In the second bonding step, isothermal solidification is completed by holding the temperature until a structure of the molten pressure-bonded portion in which an isothermal solidification has not been completed is completely extinguished.

In the method of producing the common rail according to this embodiment, by the first bonding step, a thin bonded alloy layer is formed at the molten pressure-bonded portion. Therefore, the holding time for completing the isothermal solidification in the liquid phase diffusion bonding process can be significantly shortened. As a result, it is possible to secure an excellent bonding quality and improve the productivity of the bonded joint. Further, in this embodiment, since the deformation amount of the holder caused by the first bonding step is extremely small, a required joint performance and an accurate shape can be obtained without a shape correction process.

Meanwhile, for example, if the liquid phase diffusion bonding process is not performed and an electric resistance welding such as projection welding is solely performed, the holder will be largely deformed and a shape correction process will be required.

Further, if the liquid phase diffusion bonding process is solely performed, it is desirable to reduce the thickness of the amorphous alloy metal foil, but the reduced amount of the thickness is at most about 10 μm. Therefore, in order to melt the amorphous alloy metal and a portion in the vicinity of the amorphous alloy metal for completing the isothermal solidification, it is necessary to increase the welding force or the holding time. However, if the welding force is excessively increased, the joint will be deformed. Accordingly, in order to suppress the deformation and complete the isothermal solidification, a holding time of 100 seconds or more is required.

On the other hand, in the common rail according to this embodiment, it is confirmed from results of optical microscope observations for cross-sectional structures of the joint, that the thickness of the bonded alloy layer obtained by the first bonding step which consists of a structure in which the amorphous alloy metal foil is melted and solidified, is 5 μm or less. In the liquid phase diffusion bonding process performed as a second bonding step after the first bonding step, the isothermal solidification in the extremely thin bonding alloy metal layer formed by the first bonding step is substantially completed by holding the temperature at the melting point of the amorphous alloy metal foil or higher for about 15 seconds.

The inventors of the present invention conducted studies to confirm that, generally, if a carbon steel is used as a bonding material, a structure in which an isothermal solidification is completed can be obtained by holding the temperature for about 30 seconds, so as to obtain a required joint performance. By performing the second bonding step (liquid phase diffusion bonding process) after the first bonding step as explained above, it is possible to significantly shorten the holding time for completing the isothermal solidification in the liquid phase diffusion bonding process, that is, it is possible to significantly shorten the holding time for completely extinguishing a structure in which an isothermal solidification is not completed in the alloy metal layer of the bonding portion. Accordingly, by performing the first bonding step (heat pressure bonding process) and the second bonding step (liquid phase diffusion bonding process), high bonding quality can be secured and the bonding duration can be shortened, thereby largely improving the productivity of the common rail.

In the common rail according to this embodiment, within both ends of the holder before the first bonding step, the wall thickness at the bonding surface is thinner than the wall thickness at the pressing surface that contacts with the electrode of the electric resistance welder. By employing a configuration in which the deformation introducing portion is formed by reducing the wall thickness at the bonding surface of the holder, the strain can be concentrated at a portion in the vicinity of the bonding surface. Further, by reducing the wall thickness at the portion in the vicinity of the bonding surface, the bonding surface is preferentially heated at the time of performing the electric resistance welding as a first bonding step. As a result, the deformation of the entire holder can be significantly reduced, and the variability of the holder shape can be suppressed. The deformation introducing portion may be realized, for example, by machining a part of the common rail holder.

In a related art, the holder before the first bonding step has a constant wall thickness from a pressing surface to a bonding surface. In this case, when the welding force is applied in the first bonding step, a certain stress is added to the entire holder. Therefore, at the time of performing heat pressure bonding process, the holder is strained gradually from a portion in the vicinity of the bonding surface where the temperature becomes high due to the resistance heat, and eventually the entire holder is deformed.

However, as shown in an example in FIG. 5, the holder according to this embodiment has a configuration in which the wall thickness at the bonding surface is thinner than the wall thickness at the pressing surface which contacts with an electrode. With this configuration, the temperature of a portion in the vicinity of the bonding surface having a cross-sectional area smaller than the pressing surface which contacts with the electrode, and the deformation is concentrated at the deformation introducing portion where the strength is relatively decreased, thus, the other portion does not deform significantly. Therefore, at the portion other than the deformation introducing portion, the variation of the size in each holder portion due to the first bonding step is extremely small.

Further, based on the studies and results of the experimentations conducted by the inventors of the present invention, the optimal shape of the deformation introducing portion of the holder was determined. That is, the shape of the common rail holder according to this embodiment may be determined so that the height h [mm] of the deformation introducing portion, and the difference (T−t) [mm] (hereinafter, referred to "reduced wall thickness amount") between the wall thickness T [mm] at the pressing surface and the wall thickness t [mm] at the bonding surface satisfy the Formula 2 and/or Formula 3.

$$1.0 \text{ mm} \leq h \leq 5.0 \text{ mm} \quad \text{(Formula 2)}$$

$$0.3 \text{ mm} \leq T-t \leq 1 \text{ mm} \quad \text{(Formula 3)}$$

If the shape of the common rail holder is thus determined, the shape variability after the first bonding step can be significantly reduced.

In Formula (2), which relates to the height h [mm] of the deformation introducing portion, the lower limit is set to 1.0 mm and the upper limit is set to 5.0 mm. If the height h is 1.0 mm or more, the effect of suppressing the deformation of the entire holder can be sufficiently obtained. In addition, if the height h is 5.0 mm or less, the deformation introducing portion can be avoided from the occurrence of the buckling deformation. Meanwhile, if the height h is high, the amount of machining will increase. For this reason, the height h may be set to 4.0 mm or less.

In the shape shown in FIG. 5, the height h of the deformation introducing portion is the height measured along the pressing axis direction from the bonding surface to a portion where the reduced wall thickness amount (T−t) [mm] becomes more than 0, that is, to a step portion. FIG. 5 shows an example in which the deformation introducing portion is formed by reducing the wall thickness of the holder at the outside surface of the holder, however, the deformation introducing portion may be formed by reducing the wall thickness of the holder at the inside surface of the holder and/or the outside surface of the holder.

In Formula (3), which relates to the reduced wall thickness amount T−t [mm], the lower limit is set to 0.3 mm and the upper limit is set to 1.0 mm. If the reduced wall thickness amount is 0.3 mm or more, the effect of suppressing the deformation of the entire holder can be sufficiently obtained. Meanwhile, if the reduced wall thickness amount is 1.0 mm or less, it is possible to suppress the occurrence of the buckling deformation at the deformation introducing portion.

Meanwhile, if the reduced wall thickness amount is increased, the amount of machining will increase. Therefore, in view of the productivity, the reduced wall thickness amount may be set to 0.8 mm or less.

Figure 6:
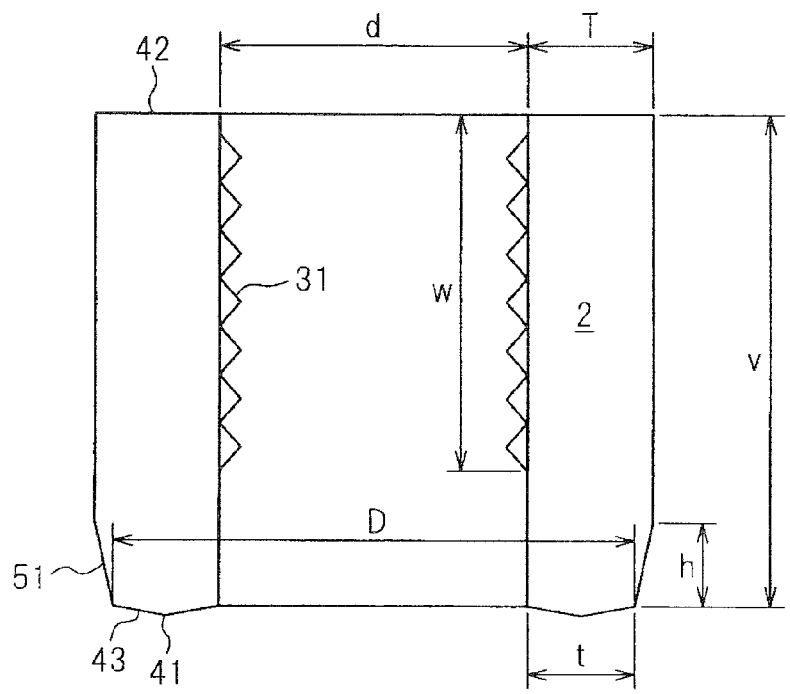
FIG. 6 shows an example of a holder having a tapered deformation introducing portion (reduced wall thickness portion to be crushed), according to an embodiment of the present invention.

Further, as a modified example, the shape of the deformation introducing portion in the holder may be formed in a tapered shape in which the wall thickness is gradually varied as shown in FIG. 6. That is, the wall thickness of the deformation introducing portion may have a shape in which the wall thickness of the deformation introducing portion becomes thinner toward the convex bonding surface. In this case, the height h of the deformation introducing portion is the height measured along the pressing axis direction from the bonding surface, that is, from the top end of the tapered portion, to the portion where the reduced wall thickness amount (T−t) [mm] becomes 0. Note that FIG. 6 shows an example in which the outside surface of the holder is tapered to reduce the wall thickness, but the wall thickness may be reduced at the inside surface. In addition, the wall thickness may be reduced at both of the outside surface and the inside surface.

Furthermore, studies conducted by the inventors of the present invention clarified that, depending on the shape of the deformation introducing portion, the deformation introducing portion becomes susceptible to the occurrence of the buckling deformation. If the buckling deformation occurs in the deformation introducing portion of the holder, the stress due to the welding force in the first bonding step does not transmit to the amorphous alloy metal foil, thus, this makes it difficult to reduce the thickness of the foil under a certain thickness. Therefore, if the liquid phase diffusion bonding process is conducted in the second bonding step, at the circumferential portion of the bonding surface where the foil thickness tends to be the thinnest among the bonding surface, a structure in which an isothermal solidification has not been completed may be remained. This does not influence joint quality, but at the time of performing an ultrasonic inspection after the bonding processes, incorrect determinations will occur.

Then, the inventors of the present inventors reviewed conditions regarding the height h of the deformation introducing portion, the outside diameter D of the bonding surface, and the wall thickness t, which are preferable for completing the first bonding step not involving buckling deformation of the holder.

As a result, it was discovered that when the Formula 4 or the Formula 5 is satisfied, the first bonding step can be achieved without the occurrence of the buckling deformation.

$$4.35 \leq D/t \leq 21.7 \quad \text{(Formula 4)}$$

$$D/t \leq h/0.23 \quad \text{(Formula 5)}$$

Furthermore, it was discovered that when the Formula 4 and the Formula 5 are both satisfied, the occurrence of the buckling deformation can be certainly suppressed. Therefore, in view of the defect generation ratio in the common rail production, it is preferable that the Formula 4 and the Formula 5 are both satisfied.

Figure 1:
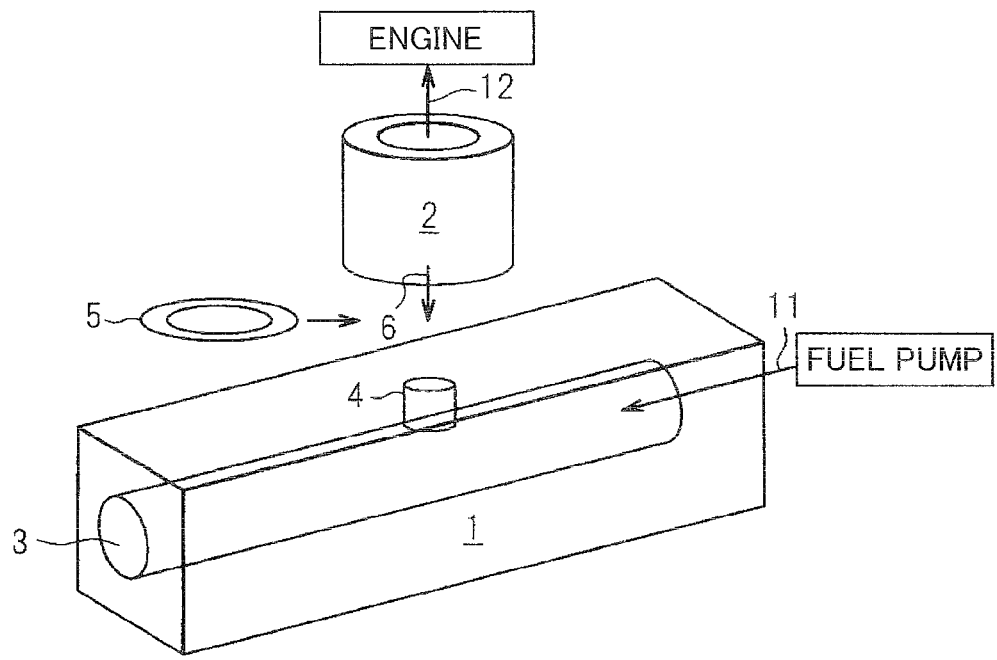
FIG. 1 is a schematic view for explaining a first holder bonding step in a common rail producing method according to related art.
Figure 2:
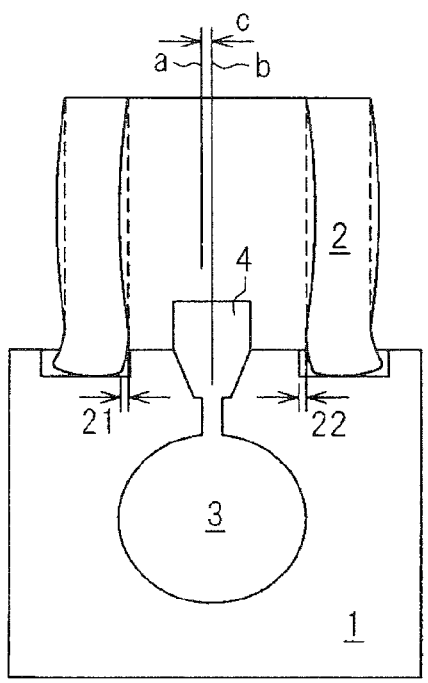
FIG. 2 shows a state in which a holder is deformed after a first bonding step in a common rail producing method according to related art.
Figure 3:
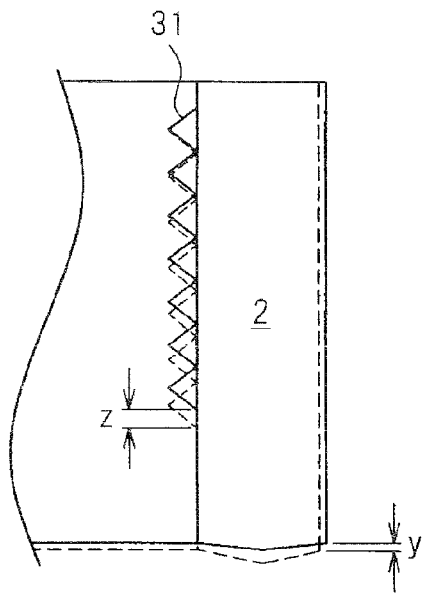
FIG. 3 is a schematic view including an inner side of a holder in which screw-thread pitches are varied after a first bonding step, in a common rail producing method according to related art.

If the value D/t is large, that is, the outside diameter of a steel pipe is relatively large with respect to the wall thickness of the steel pipe, the portion in the vicinity of the bonding surface of the holder 2 outwardly flares out at the time of the current-applying process and heating process in the first bonding step, as shown in FIG. 2. In this case, the bonding displacement "i" due to the opened amount 13 of the inner side of the holder is generated, and in the subsequent steps, mechanical parts to be connected to the holder cannot be attached. Therefore, the upper limit of the D/t is preferably 21.7. This corresponds to a case in which the height h of the deformation introducing portion is 5 mm. Note that the bonding displacement "i" is an axis to axis distance between a center axis "f" of the holder 2 and a center axis "g" of the branch conduit 4 of the common rail body 1, measured after the first bonding step.

The tapered deformation introducing portion as shown in FIG. 6 is formed by smoothly machining the holder so as to gradually reduce the wall thickness from the pressing surface having the wall thickness T to the bonding surface having the wall thickness t. In this case, by satisfying the Formula 4 and/or the Formula 5, with the minimum amount of the holder deformation, the thickness of the amorphous foil at the molten pressure-bonded portion after the first bonding step can be reduced.

As a metal material for the common rail body and the holder, a steel material is generally used. The mechanical properties of the metal material should not be limited in the present invention, but preferably, a metal material with a strength that can bear the inner pressure of up to 150 MPa, which is the common rail usage environment, is employed.

The amorphous alloy metal foil used for the liquid phase diffusion bonding process is preferably cut in the ring shape that covers at least the bonding area. Further, the composition of the amorphous alloy metal foil used for the liquid phase diffusion bonding process preferably includes Ni or Fe as a base component, and as diffusing elements, at least one of B, P and C respectively in the amount of 0.1-20.0 atom %.

In the first bonding step, for performing press bonding, the welding current is applied to the bonding surfaces (butt welding surfaces) of the holder and the common rail body to generate the resist heat, thereby heating and melting the amorphous metal foil and a portion around thereof. In the first bonding step, a part of bonding surfaces of the holder and the common rail body, and the alloy metal foil for the liquid phase diffusion bonding process are melted by the input welding heat of the electric resistance welding, thereby performing upset welding using the welding force applied from the electrode of the electric resistance welder. As a result, oxides and foreign substances generated on the bonding surface at the time of heat melting come out from the bonding surface together with the molten metal.

The first bonding step is, for example, performed by using an electric resistance welder in which electrodes are arranged at the upper side and the lower side of each holder, and a hydraulic tensile/compression testing machine from Instron is used as a stress applying mechanism for applying the welding force to a portion between the butt welding surfaces. As a method of the electric resistance welding for the first bonding step, one of electric heat type welding methods such as a spot welding, a projection welding, an upset welding, and a flush-butt welding can be employed. The present invention should not be limited by these electric resistance welding methods. The welding method can be suitably selected in accordance with the characteristics of the welding methods, the performance required for the bonded joint, the welding conditions, and the like.

The duration of the first bonding step is preferably 10 seconds or less, for improving the productivity. In order to melt the groove faces and the amorphous alloy metal foil used for the liquid phase diffusion bonding process which is arranged between the groove faces in a short time, the electric current density is preferably set to 100 A/mm$^2$ or more in the electric resistance welding in the first bonding step. On the other hand, if the electric current density is excessively increased, the molten metal from the amorphous alloy metal foil is nonuniformly distributed, thus, it becomes difficult to distribute the molten metal uniformly in a certain thickness on the groove faces. For this reason, the upper limit of the electric current density in the electric resistance welding is preferably set to 100,000 A/mm$^2$ or less.

The welding force in the electric resistance welding in the first bonding step is preferably 10 MPa or more, so that the oxides and foreign substances generated at the bonding surface can come out from the bonding surface together with the molten metal. In this case, it is possible to reduce the thickness of the bonded alloy metal layer formed in the molten pressure-bonded portion to be 10 μm or less, thereby shortening the bonding duration for the second bonding. Since an excessively high welding force may lead to the occurrence of the deformation in the bonded joint, the upper limit of the welding force is preferably set to 1000 MPa or less. The degree of the deformation of the bonded joint varies based on the Young's modulus at the welding temperature of the bonded material, thus, the upper limit of the welding force is preferably set in accordance with the properties of the bonded material.

In addition, the joint efficiency (area of a groove face before the molten pressure bonding/area of a joint portion after the molten pressure bonding) of the molten pressure-bonded portion formed by the electric resistance welding in the first bonding step is preferably 0.5 or more. Taking the joint fixing effect after bonding steps due to the shape of the groove portion into account, if the joint efficiency is 0.5 or more, the static tensile strength can be equalized or more than that of the base material. Further, if the joint portion is deformed by a high welding force at the time of performing an electric resistance welding, the joint area becomes larger than the cross-sectional area of the base material. In order to obtain an excellent joint performance even in such case, the upper limit of the joint efficiency is preferably set to 2.0 or less.

Figure 7:
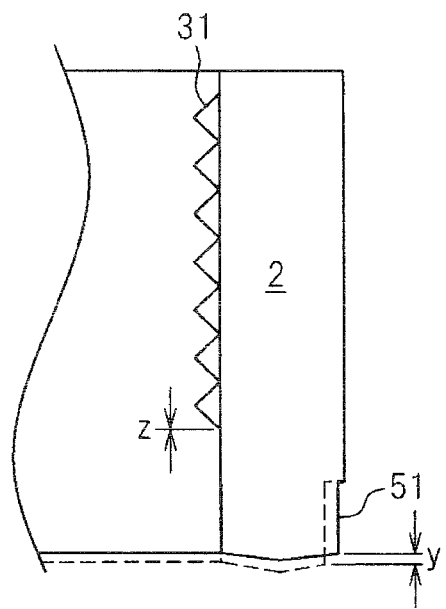
FIG. 7 is a schematic view that shows a holder deformation before and after a first bonding step, in a producing method of a common rail according to an embodiment of the present invention.

FIG. 7, which is a schematic view of the common rail holder according to this embodiment, shows how the holder shape changes after performing the first bonding step for bonding the holder to the common rail body. The broken lines represent the holder shape before performing the bonding process, and the continuous lines represent the holder shape after performing the bonding process.

Employing the common rail holder according to this embodiment, the deformation caused by the first bonding step merely occurs in the deformation introducing portion 51 in which the wall thickness is to be increased and the height is to be decreased, that is, the deformation of the screw-thread portion 31 and the deformation of the entire holder 2 can be suppressed.

EXAMPLES

Common rails were respectively produced by using an amorphous alloy metal foil A or B for a liquid phase diffusion bonding process which has chemical components and the melting point shown in Table 1, and a steel STPA 28 which has chemical components shown in Table 2. A first bonding step (heat pressure bonding process) was performed after butting a bonding surface of a holder and a bonding surface of a common rail body with a ring-shaped amorphous alloy metal foil inserted therebetween. In the first bonding step, by means of electrodes of the electric resistance welder that closely contact with the holder and the common rail body respectively, an electric current was applied to the bonding surface and the welding force was simultaneously applied to the perpendicular direction using a hydraulic stress transmitting board (not shown) from the upper direction of the holder.
[Table 1]
[Table 2]

Next, as a second bonding step (liquid phase diffusion bonding process), the bonded joint was heated to the heating temperature of 1150° C. in an electronic furnace having high-frequency induction heating coils and resistance heating elements. Then, after holding the heating temperature for a certain time so as to complete the isothermal solidification in the bonding alloy metal layer formed by the first bonding step, the bonded joint was cooled.

Table 3 and Table 4 show types of the bonding foil (alloy metal foil), holder shapes, holder sizes, and evaluated results of the holders. As to the holder shapes, "FIG. 5" means a shape of a holder with a stepped deformation introducing portion, and "FIG. 6" means a shape of a holder with a tapered deformation introducing portion.
[Table 3]
[Table 4]

The holder evaluation results shown in Table 3 and Table 4 are made on the basis of the following criteria.
(Bonding Displacement)

After performing the first bonding step, an axis to axis distance between a center axis of the holder and a center axis of the branch conduit of the common rail body was measured by using a dedicated jig. Based on this result, a case in which the axis to axis distance was 0.1 mm or less was evaluated as "GOOD", and a case in which the axis to axis distance was 0.1 mm or more was evaluated as "POOR".
(Shape Correction)

A case in which a correction of a screw-thread or a correction of the common rail holder height was required was evaluated as "REQUIRED", and a case in which the correction was not required was evaluated as "NOT REQUIRED".
(Bonding Surface Structure)

The existence of the defect in the bonding surface was examined by the ultrasonic inspection. Based on this result, a case in which no defect was found was evaluated as "VERY GOOD", a case in which a minor defect was found but does not influence the performance was evaluated as "GOOD", and a case in which a significant defect was found was evaluated as "POOR".

(Inner Pressure Fatigue Test)

A case in which a fuel leakage was not occurred before the repeat count reached $10^7$ under the maximum stress load of 2000 atmospheric pressure was evaluated as "GOOD", and a case in which a fuel leakage occurred before that was evaluated as "POOR".

As shown in Table 3, excellent evaluation results were obtained in the embodiments 1-10 that correspond to the present invention. Particularly, in the embodiments 2, 3, 5, and 10 in which the height h [mm] of the deformation introducing portion, the wall thickness t [mm] at the bonding surface, and the outside diameter D [mm] of the bonding surface satisfy both the Formula 4 and the Formula 5, the buckling deformation of the holder was suppressed and no defect was found in the supersonic inspection conducted after the second bonding step.

$$4.35 \leq D/t \leq 21.7 \qquad \text{(Formula 4)}$$

$$D/t \leq h/0.23 \qquad \text{(Formula 5)}$$

The comparative examples 11-16 in Table 4 are examples in which one or some values were not included in the preferable range of the present invention. In the comparative examples 11 and 14 in which the reduced wall thickness amount T−t of the deformation introducing portion was small, the deformation amount of the holder was relatively large. In the comparative examples 12 and 15 in which the height h of the deformation introducing portion was small, the buckling deformation occurred in the deformation introducing portion by the first bonding step, and the result of the inner pressure fatigue test was relatively bad when compared to that of the examples having conditions included in the preferable range. In the comparative examples 13 and 16 in which the height h of the deformation introducing portion was large, a portion in the vicinity of the bonding surface of the holder was flared out, and the displacement was generated at the bonding portion.

In the comparative examples 17 and 18 in which a deformation introducing portion was not provided for the holder, the bonding displacement and the holder deformation amount were both large, and the result of the inner pressure fatigue test was bad when compared to that of the examples corresponding to the present invention.

INDUSTRIAL APPLICABILITY

According to the present invention, it is possible to produce a common rail that can bear the fuel injection pressure of up to 250 MPa. As a result, the present invention remarkably contributes to the industry by providing a diesel engine with high power, low fuel consumption, and high torque that uses a gas oil as a fuel.

BRIEF DESCRIPTION OF THE REFERENCE SYMBOLS

| | |
|---|---|
| 1 | common rail body |
| 2 | holder |
| 3 | inner conduit |
| 4 | branch conduit |
| 5 | amorphous alloy metal foil |
| 6 | welding force |
| 11 | fuel flow from a fuel pump to a common rail |
| 12 | fuel flow from a common rail to an engine |
| 21 | opened amount of an inner side of a holder after a first bonding step |
| 22 | a gap between an inner side of a holder and an inner side of a common rail after a first bonding step |
| 31 | screw-thread portion |
| 41 | bonding surface |
| 42 | pressing surface |
| 43 | convex bonding portion (groove portion) |
| 51 | deformation introducing portion (reduced wall thickness portion to be crushed) |
| a | center axis of a holder |
| b | center axis of a branch conduit of a common rail body |
| c | bonding displacement |
| D | outside diameter of a bonding surface of a holder |
| d | inside diameter of a holder |
| h | height of a deformation introducing portion of a holder |
| T | wall thickness of a holder at a pressing surface |
| t | wall thickness of a holder at a bonding surface |
| v | height of a holder before a first bonding step |
| w | height of a screw-thread portion before a first bonding step |
| y | crush amount of an entire holder by a first bonding step |
| z | crush amount of a screw-thread portion by a first bonding step |

TABLE 1

Chemical components of the bonding foil (at %)

| bonding foil type | Base | Si | B | V | melting point (° C.) |
|---|---|---|---|---|---|
| A | Ni | 3.5 | 8 | 11 | 1073 |
| B | Fe | 2.5 | 12 | 8 | 1122 |

TABLE 2

Main chemical components of the material to be bonded (mass %)

| steel type | C | Si | Mn | Fe | Cr | Mo | Nb | V | N |
|---|---|---|---|---|---|---|---|---|---|
| STPA28 | 0.1 | 0.3 | 0.5 | bal. | 9 | 1 | 0.05 | 0.2 | 0.04 |

TABLE 3

Holder size and evaluation results of the bonded portion according to examples

| | | | holder size | | | | | | | | |
|---|---|---|---|---|---|---|---|---|---|---|---|
| | | | electrode side | | | bonding surface side | | | | | reduced |
| | foil | holder shape | inside diameter (d) mm | outside diameter (D) mm | wall thickness (T) mm | inside diameter (d) mm | outside diameter (D) mm | wall thickness (T) mm | machined height (h) mm | D/t | h/0.23 | thickness amount T − t mm |
| Example 1 | A | FIG. 5 | 17.0 | 25.0 | 4.0 | 17.0 | 23.0 | 3.0 | 1.5 | 7.67 | 6.52 | 1.0 |
| Example 2 | A | FIG. 5 | 17.0 | 25.0 | 4.0 | 17.0 | 23.0 | 3.0 | 3.0 | 7.67 | 13.04 | 1.0 |
| Example 3 | A | FIG. 5 | 17.0 | 25.0 | 4.0 | 17.0 | 23.0 | 3.0 | 4.0 | 7.67 | 17.39 | 1.0 |
| Example 4 | A | FIG. 5 | 17.0 | 26.5 | 4.8 | 17.0 | 22.0 | 2.5 | 1.5 | 8.80 | 6.52 | 2.3 |
| Example 5 | A | FIG. 5 | 17.0 | 26.5 | 4.8 | 17.0 | 22.0 | 2.5 | 3.0 | 8.80 | 13.04 | 2.3 |
| Example 6 | A | FIG. 5 | 3.6 | 12.8 | 4.6 | 3.6 | 11.6 | 4.0 | 1.0 | 2.90 | 4.35 | 0.6 |

TABLE 3-continued

Holder size and evaluation results of the bonded portion according to examples

| | | | | | | | | | | | |
|---|---|---|---|---|---|---|---|---|---|---|---|
| Example 7 | A | FIG. 5 | 3.6 | 12.8 | 4.6 | 3.6 | 11.6 | 4.0 | 4.0 | 2.90 | 17.39 | 0.6 |
| Example 8 | A | FIG. 5 | 19.5 | 26.0 | 3.3 | 19.5 | 24.5 | 2.5 | 2.0 | 9.80 | 8.70 | 0.8 |
| Example 9 | B | FIG. 6 | 17.0 | 25.0 | 4.0 | 17.0 | 23.0 | 3.0 | 1.5 | 7.67 | 6.52 | 1.0 |
| Example 10 | B | FIG. 6 | 17.0 | 25.0 | 4.0 | 17.0 | 23.0 | 3.0 | 3.0 | 7.67 | 13.04 | 1.0 |

| | holder evaluation | | | | |
|---|---|---|---|---|---|
| | bonding displacement | shape correction | bonding surface structure | inner pressure fatigue test | total evaluation |
| Example 1 | GOOD | NOT REQUIRED | GOOD | GOOD | GOOD |
| Example 2 | GOOD | NOT REQUIRED | VERY GOOD | GOOD | GOOD |
| Example 3 | GOOD | NOT REQUIRED | VERY GOOD | GOOD | GOOD |
| Example 4 | GOOD | NOT REQUIRED | GOOD | GOOD | GOOD |
| Example 5 | GOOD | NOT REQUIRED | VERY GOOD | GOOD | GOOD |
| Example 6 | GOOD | NOT REQUIRED | GOOD | GOOD | GOOD |
| Example 7 | GOOD | NOT REQUIRED | GOOD | GOOD | GOOD |
| Example 8 | GOOD | NOT REQUIRED | GOOD | GOOD | GOOD |
| Example 9 | GOOD | NOT REQUIRED | GOOD | GOOD | GOOD |
| Example 10 | GOOD | NOT REQUIRED | VERY GOOD | GOOD | GOOD |

TABLE 4

Holder size and evaluation result of the bonded portion according to comparative examples

| | | | holder size | | | | | | | | | |
|---|---|---|---|---|---|---|---|---|---|---|---|---|
| | | | electrode side | | | bonding surface side | | | | | | |
| | foil | holder shape | inside diameter (d) mm | outside diameter (D) mm | wall thickness (T) mm | inside diameter (d) mm | outside diameter (D) mm | wall thickness (T) mm | machined height (h) mm | D/t | h/0.23 | reduced thickness T − t mm |
| Comparative Example 11 | A | FIG. 5 | 17.0 | 25.0 | 4.0 | 17.0 | 24.6 | 3.8 | 3.0 | 6.47 | 13.04 | 0.2 |
| Comparative Example 12 | B | FIG. 5 | 17.0 | 25.0 | 4.0 | 17.0 | 23.0 | 3.0 | 0.7 | 7.67 | 3.04 | 1.0 |
| Comparative Example 13 | A | FIG. 6 | 17.0 | 26.5 | 4.8 | 17.0 | 25.0 | 4.0 | 6.0 | 6.25 | 26.09 | 0.8 |
| Comparative Example 14 | B | FIG. 5 | 3.6 | 12.8 | 4.6 | 3.6 | 12.5 | 4.5 | 2.0 | 2.81 | 8.70 | 0.2 |
| Comparative Example 15 | A | FIG. 5 | 3.6 | 12.8 | 4.6 | 3.6 | 11.6 | 4.0 | 0.5 | 2.90 | 2.17 | 0.6 |
| Comparative Example 16 | A | FIG. 6 | 3.6 | 12.8 | 4.6 | 3.6 | 11.6 | 4.0 | 6.0 | 2.90 | 26.09 | 0.6 |
| Comparative Example 17 | A | — | 17.0 | 25.0 | 4.0 | 17.0 | 25.0 | 4.0 | 0 | — | 0.00 | 0 |
| Comparative Example 18 | A | — | 3.6 | 12.8 | 4.6 | 3.6 | 12.8 | 4.6 | 0 | — | 0.00 | 0 |

| | holder evaluation | | | | |
|---|---|---|---|---|---|
| | bonding displacement | shape correction | bonding surface structure | inner pressure fatigue test | total evaluation |
| Comparative Example 11 | GOOD | REQUIRED | POOR | GOOD | POOR |
| Comparative Example 12 | GOOD | NOT REQUIRED | POOR | POOR | POOR |
| Comparative Example 13 | POOR | NOT REQUIRED | GOOD | POOR | POOR |
| Comparative Example 14 | GOOD | REQUIRED | POOR | GOOD | POOR |
| Comparative Example 15 | GOOD | NOT REQUIRED | POOR | POOR | POOR |
| Comparative Example 16 | POOR | NOT REQUIRED | GOOD | POOR | POOR |
| Comparative Example 17 | POOR | REQUIRED | POOR | POOR | POOR |
| Comparative Example 18 | POOR | REQUIRED | POOR | POOR | POOR |

The invention claimed is:

1. A common rail formed by bonding a common rail body and a common rail holder which has a pressing surface and a convex bonding surface, by means of a heat pressure bonding process and a liquid phase diffusion bonding process, wherein:
a height H of the convex bonding surface satisfies $1\ \mu m \leq H \leq 50\ \mu m$; and the common rail holder includes a deformation introducing portion in which an area of a cross-section parallel to the pressing surface is smaller than an area of the pressing surface.

2. The common rail according to claim 1, wherein:
the height h of the deformation introducing portion before the heat pressure bonding process satisfies $1.0\ mm \leq h \leq 5.0\ mm$; and a wall thickness T at the pressing surface and a wall thickness t at the convex bonding surface satisfy $0.3\ mm \leq T-t \leq 1\ mm$.

3. The common rail according to claim 1 or 2, wherein
an outside diameter D of the convex bonding surface and a wall thickness t at the convex bonding surface before the heat pressure bonding process satisfy $4.35 \leq D/t \leq 21.7$.

4. The common rail according to claim 1 or 2, wherein
an outside diameter D of the convex bonding surface, a wall thickness t at the convex bonding surface, and a height h of the deformation introducing portion satisfy $D/t \leq h/0.23$.

5. The common rail according to claim 1 or 2, wherein
a thickness of the deformation introducing portion is tapered toward the convex bonding surface.

6. A common rail holder having a pressing surface and a convex bonding surface for forming a common rail by being bonded to a common rail body, by means of a heat pressure bonding process and a liquid phase diffusion bonding process, wherein:
a height H of the convex bonding surface satisfies $1\ \mu m \leq H \leq 50\ \mu m$;

the common rail holder includes a deformation introducing portion in which an area of a cross-section parallel to the pressing surface is smaller than an area of the pressing surface;
a height h of the deformation introducing portion satisfies $1.0\ mm \leq h \leq 5.0\ mm$; and a wall thickness T at the pressing surface and a wall thickness t at the convex bonding surface satisfy $0.3\ mm \leq T-t \leq 1\ mm$.

7. The common rail holder according to claim 6, wherein
an outside diameter D of the convex bonding surface and a thickness t at the convex bonding surface satisfy $4.35 \leq D/t \leq 21.7$.

8. The common rail holder according to claim 6 or 7, wherein
an outside diameter D of the convex bonding surface, a wall thickness t at the convex bonding surface, and the height h of the deformation introducing portion satisfy $D/t \leq h/0.23$.

9. The common rail holder according to claim 6 or 7, wherein
a thickness of the deformation introducing portion is tapered toward the convex bonding surface.

10. A method of producing a common rail formed by bonding a common rail body and a common rail holder which has a pressing surface and a convex bonding surface, comprising:
performing a heat pressure bonding process to form a molten pressure-bonded portion by arranging an amorphous alloy metal foil between the common rail body and the common rail holder, the common rail holder having a deformation introducing portion in which an area of a cross-section parallel to the pressing surface is smaller than an area of the pressing surface, and
performing a liquid phase diffusion bonding process by heating the molten pressure-bonded portion to a temperature of melting point of the amorphous alloy metal foil or higher, and holding the temperature to solidify the molten pressure-bonded portion.

11. The method of producing the common rail according to claim 10, wherein
a height h of the deformation introducing portion before the heat pressure bonding process satisfies:

$1.0\ mm \leq h \leq 5.0\ mm$; and a wall thickness T of the pressing surface and a wall thickness t at the convex bonding surface satisfy $0.3\ mm \leq T-t \leq 1\ mm$.

12. The method of producing the common rail according to claim 10 or 11, wherein
an outside diameter D of the convex bonding surface and a wall thickness t at the convex bonding surface before the heat pressure bonding process satisfy $4.35 \leq D/t \leq 21.7$.

13. The method of producing the common rail according to claim 10 or 11, wherein
an outside diameter D of the convex bonding surface, a wall thickness t at the convex bonding surface, and a height h of the deformation introducing portion satisfy $D/t \leq h/0.23$.

14. The method of producing the common rail according to claim 10 or 11, wherein
a thickness of the deformation introducing portion is tapered toward the convex bonding surface.

* * * * *

UNITED STATES PATENT AND TRADEMARK OFFICE
CERTIFICATE OF CORRECTION

PATENT NO. : 8,490,600 B2  
APPLICATION NO. : 13/054877  
DATED : July 23, 2013  
INVENTOR(S) : Ryuichi Honma et al.

Page 1 of 1

It is certified that error appears in the above-identified patent and that said Letters Patent is hereby corrected as shown below:

ON THE TITLE PAGE:

At item (30), correct the Foreign Priority Application Data, as follows:

Change: "Nov. 19, 2009   (JP) .......................... P2009-264147"

To: --Nov. 19, 2009  (JP) .......................... P2009-264174--.

Signed and Sealed this  
Thirty-first Day of December, 2013

Margaret A. Focarino  
*Commissioner for Patents of the United States Patent and Trademark Office*